UNITED STATES PATENT OFFICE.

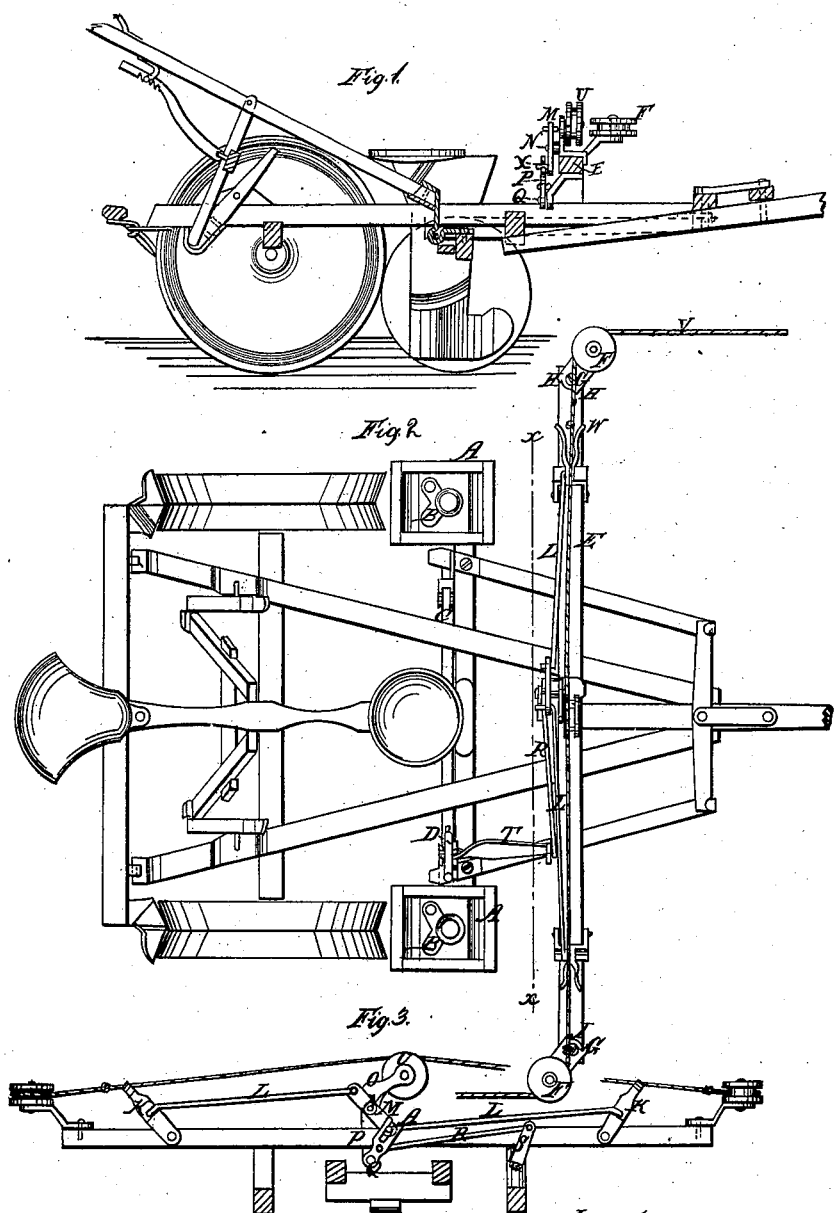

GEORGE D. HAWORTH, OF DECATUR, ILLINOIS.

IMPROVEMENT IN CORN-PLANTERS.

Specification forming part of Letters Patent No. 100,032, dated February 22, 1870.

*To all whom it may concern:*

Be it known that I, GEO. D. HAWORTH, of Decatur, in the county of Macon and State of Illinois, have invented a new and Improved Corn-Planter; and I do hereby declare that the following is a full, clear, and exact description thereof, which will enable those skilled in the art to make and use the same, reference being had to the accompanying drawings, forming part of this specification.

This invention relates to improvements in that class of corn-planters wherein the valves are worked by a knotted cord stretched across the field, secured at each end and working over the machine as it moves back and forth to work the valves.

The invention has for its object first, to take up the knotted cord by the machine and lay it over in the position for the next passage, so that in working over the machine it will not be drawn, as is now the case, obliquely to it, whereby the clogging and catching of the cord upon sticks, stones, clods, and the like are avoided, which now requires a person to walk in advance to arrange the cord; second, an arrangement of slotted arms on a cross-bar, over which the cord is transferred from side to side at suitable distances apart, and so connected together by rods and to the grain-slides that each knot is made to produce an advance and return movement of the seeding-slides at the proper intervals for dropping the corn, the whole constituting an attachment applicable to any machine; third, an arrangement whereby the slotted arms on which the cord acts to give the motion to the seeding-slides are given the function of moving a certain distance after the knots on the cord come in contact with them, before motion is imparted to the seeding slides, and then moving them the full stroke, and releasing them when the arms are in a position so near upright that the knots are not liable to slip off before doing their work, after which the said arms are carried onto such an inclination as to allow the knots to pass off readily; and fourth, an adjustable arrangement of guide-pulleys, all as hereinafter more fully specified.

Figure 1 represents a longitudinal sectional elevation of my improved machine. Fig. 2 represents a plan view; and Fig. 3 represents a transverse section of the same, taken on the line *x x* of Fig. 2.

Similar letters of reference indicate corresponding parts.

The hoppers A, valves or grain-slides B, slide-operating bars C, and hand-levers D are such as are used in other machinery, and need no special description, the essential features of my invention being a mode of operating these devices through the medium of the "check-row" cord and the transfer of the said cord from side to side.

E represents a long bar, arranged transversely of the machine in front of the hoppers, and designed to be as long as the distance the machine is to be moved laterally at each movement across the field. This bar carries pulleys, F, at each end, on supports G, capable of vibration, and provided with shoulders, H, for arresting and holding them at the required position by coming into contact with the pins I. K K are crotched bars, pivoted to the said bar, one near each end, and arranged to vibrate in a vertical plane. They are connected by rods L to a rocker-plate, M, pivoted centrally at N on a stand, O, rising up from the center of the bar E, one above and the other below the central pivot N. The connecting-pin for the lower rod L works in a slot in the upper end of another rocker-plate, P, pivoted at Q, and connected by a rod, R, to a crank, S, of a shaft, T, so connected to the hand-lever D that the oscillation of the shaft will vibrate the said handle and work the said slides. U represents a guide-pulley, mounted on the stud O. V represents the knotted cord, which, being fastened at each end by pins driven into the ground or other suitable means, is by these devices made use of for vibrating the said slides, giving them back and forth movements, and is itself transferred by them from one position to another as required.

The knots W are made in the cord at about twice the distances apart which the hills of corn are desired to be, and the crotched plates K are placed the same distance as the rows apart. They are worked back and forth by the knots, as follows: The knot on the left of the machine, looking in the direction of the forward movement thereof, being drawn into the crotch of the tilling-plate or arm on that side which is represented in the drawing as inclined toward the said knot, will engage with the said crotch and carry it over to the other side of the vertical line, escaping therefrom by rising up the inclines of the crotch after tilting it; thus, owing to the connection of one rod, L, above, and the other below, the axis of the rocker-plate M will tilt the crotched plate on the right toward the center, so that the same knot, when arriving at the latter crotch, will be caught in the crotch in the same way and tilted over to the right, which will throw the crotch at the left back again, to be acted upon in the same way by the next knot, and so on as long as the machine is kept in motion.

In order to produce the movement of the grain-slide in a shorter space of time than that required for the movement of the crotched plates, which is necessary to drop the corn quickly, the slot in the oscillating or rocking plate P is made wide at the top, and narrows down by curved lines toward the bottom, so that the pin X will not act on the walls thereof only when the rocker-plate M is near the vertical position, and then only for a short space, whereby it is allowed to move both before and after the movement of the plate P, without moving the latter for allowing the necessary movement of the crotched plates. The bar E and its adjuncts, and the crank-shaft T, may be detachably connected to the frame and to the hand-lever, or other means of operating the slide-bar C, so that the whole form an attachment which may be used or not, as preferred, and adapted for attachment to any machine.

I may use other arrangements of devices in connection with the rocker-plates K and the slide C for obtaining motion from the cord and imparting it to the said slide, and I do not desire to limit myself to this particular arrangement in connection with the means for transferring the corn; but, having thus described my invention, what I claim as new, and desire to secure by Letters Patent, is—

1. The combination of the knotted cord and the crotch-vibrating plates K, connected to the rocker-plate M, and together by the rods L, when arranged for each knot to produce an advance and return movement of the said crotch plates and rocker-plates, substantially as specified.

2. The combination of the rocker-plate M and crotch-plate P, when the latter is arranged as specified, to permit the movement of the rocker-plate both before and after its movement, substantially as specified.

3. The combination of the tilting crotched plates K and rocker-plate M and connecting-rods, crank S, shaft T, and hand-lever D, substantially as specified.

4. The arrangement, with the bar E, of the pulleys F and supports H, when the latter are arranged for vibration, substantially as specified.

GEO. D. HAWORTH.

Witnesses—
LYSANDER L. HAWORTH,
ORVILLE B. GORIN.